United States Patent
Han

(10) Patent No.: US 8,260,543 B2
(45) Date of Patent: Sep. 4, 2012

(54) HIDDEN POINT DETECTION AND WARNING METHOD AND APPARATUS FOR NAVIGATION SYSTEM

(75) Inventor: Maung Han, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1329 days.

(21) Appl. No.: 11/729,592

(22) Filed: Mar. 29, 2007

(65) Prior Publication Data
US 2008/0243380 A1    Oct. 2, 2008

(51) Int. Cl.
*G06F 19/00* (2006.01)
*G01C 21/30* (2006.01)

(52) U.S. Cl. ........ 701/409; 701/728; 345/419; 345/583; 345/664

(58) Field of Classification Search .......... 701/208, 701/117, 118, 119, 211, 409, 428; 340/905, 340/990, 995; 345/427, 421, 425, 419, 581, 345/583, 619, 994
See application file for complete search history.

(56) References Cited

U.S. PATENT DOCUMENTS

| | | | |
|---|---|---|---|
| 6,169,552 B1 * | 1/2001 | Endo et al. | 345/427 |
| 6,360,168 B1 * | 3/2002 | Shimabara | 701/211 |
| 6,710,774 B1 * | 3/2004 | Kawasaki et al. | 345/419 |
| 6,871,143 B2 * | 3/2005 | Fujiwara | 701/211 |
| 7,765,055 B2 * | 7/2010 | Cera et al. | 701/117 |

FOREIGN PATENT DOCUMENTS

| | | |
|---|---|---|
| JP | 2001-027535 | 1/2001 |
| JP | 2003-337032 | 11/2003 |

* cited by examiner

*Primary Examiner* — Ronnie Mancho
(74) *Attorney, Agent, or Firm* — Muramatsu & Associates

(57) ABSTRACT

A method and apparatus for a navigation system detects a hidden point on a route on a monitor screen showing a three-dimensional map when visibility of the route begins to be lost, and provides a warning message including relevant information that is helpful to navigate the hidden point. The method includes steps of displaying a three-dimensional map image which includes an image of a route on which a user or user's vehicle is travelling, detecting a hidden point of the route on the three-dimensional map image at which the route becomes invisible by an obstruction object when viewed from a current position of the user, and notifying the user about the hidden point on the route thereby enabling the user to know the hidden point on the route in advance.

20 Claims, 9 Drawing Sheets

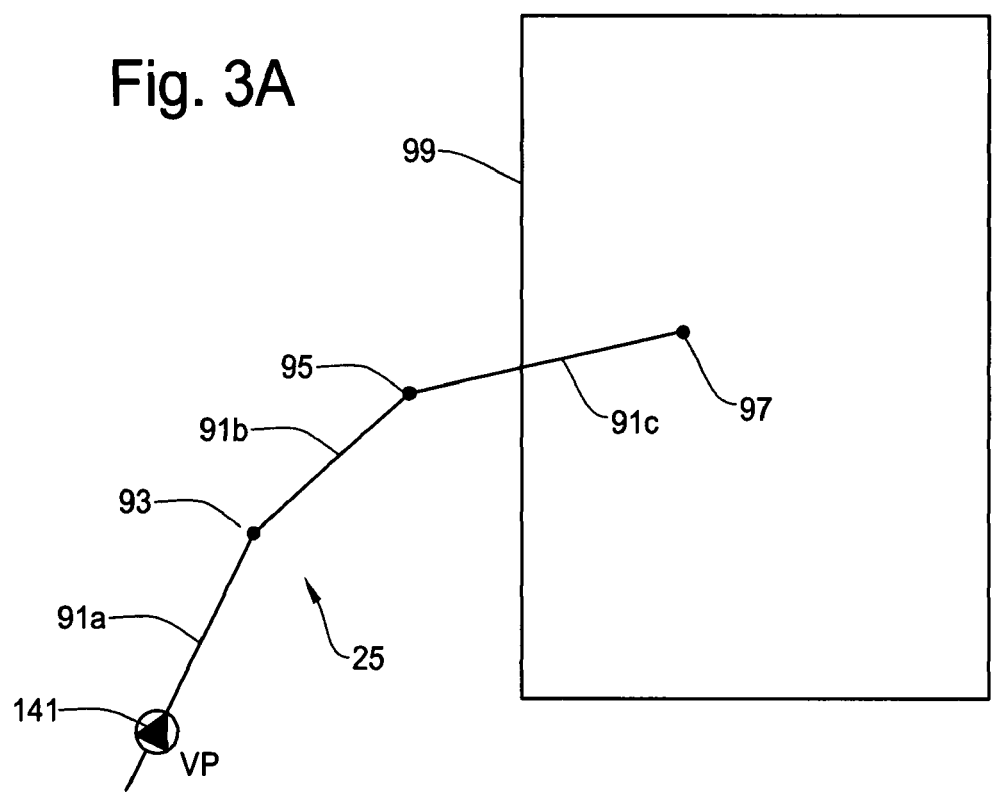
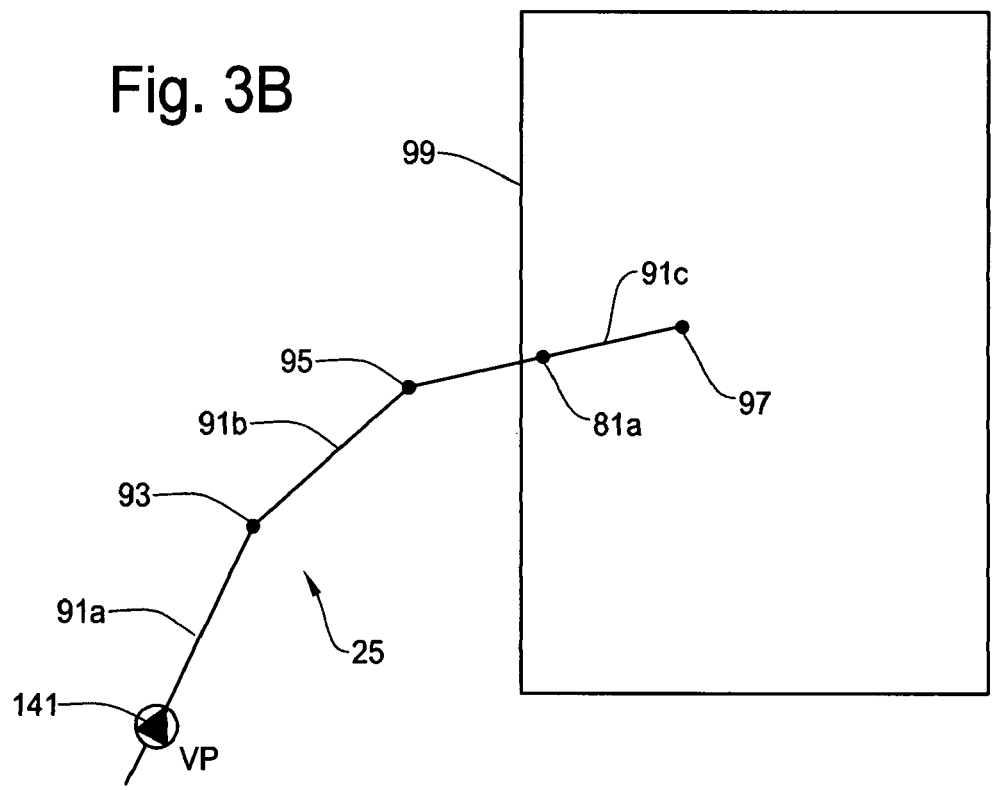

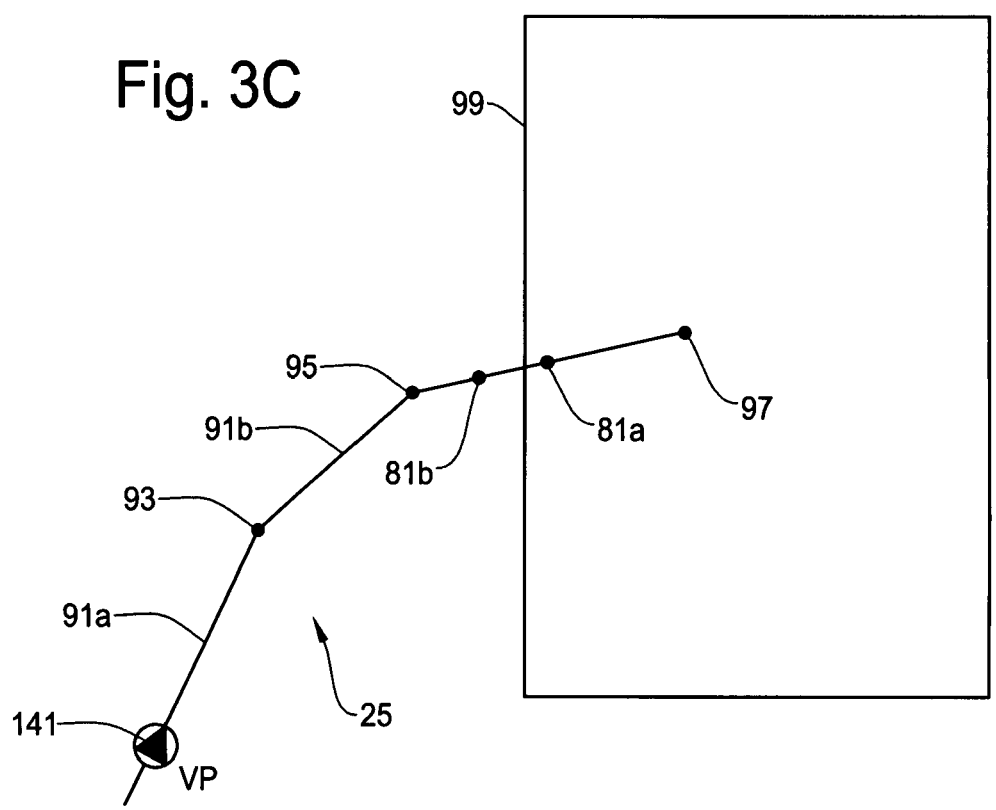
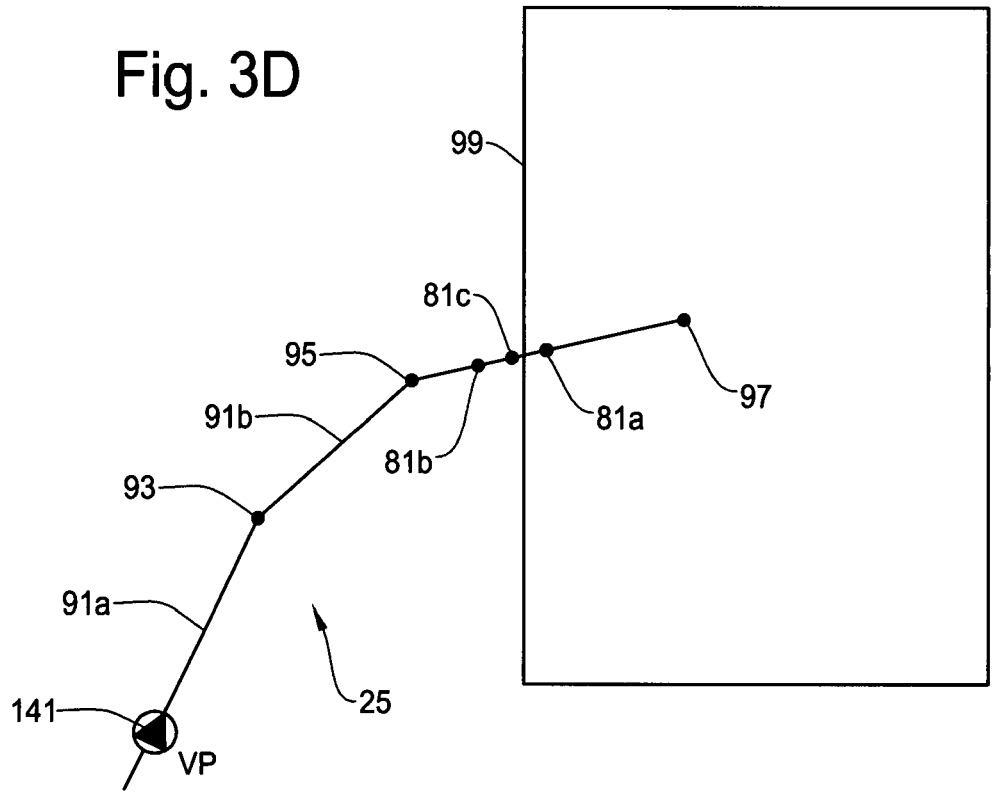

HIDDEN POINT DETECTION AND WARNING METHOD AND APPARATUS FOR NAVIGATION SYSTEM

FIELD OF THE INVENTION

This invention relates generally to a hidden point detection and warning method and apparatus for a navigation system, and more particularly, to a method and apparatus for a navigation system for finding a hidden point where visibility of a route will begin to be lost on a three-dimensional map image, and producing a warning to notify the user the location of the hidden point, a shape of the route in the vicinity of the hidden point, etc.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a DVD (digital versatile disc), a hard disc, etc.

Typically, the navigation system displays a map image on a monitor screen while superimposing thereon a mark representing the current location of the vehicle of the user. A road on which the vehicle is running will be highlighted which typically means a calculated route to the destination. Many recent navigation systems are designed to be able to display a three-dimensional map image on which roads, buildings, mountains, fields, and other objects on the surface of the ground are displayed in a three-dimensional manner.

Such a three-dimensional map image is useful for helping the user to navigate through geographic areas by providing views similar to the actual surrounding images. However, a three-dimensional map image on a navigation system screen involves drawbacks as well. While it offers views that look similar to what the driver actually sees though the windscreen, some elements, such as large buildings or natural objects can obstruct part of the three-dimensional view. For instance, a mountain or a large building can obstruct the user's view such that the user is unable to see what is ahead on the road.

FIGS. 1A-1C are diagrams showing display examples of three-dimensional map image which involve the situations where the problems described above have occurred. In the example of FIG. 1A, a view of the road 5 on which the user's vehicle is running is obstructed ahead by buildings 7 and 9. Because the three-dimensional map image typically provides a view that the user actually see through the wind shield of the vehicle, the road at the other side of the buildings are invisible.

In another example of FIG. 1B, a view of the road 15 is obstructed ahead by a mountain 17 and other surroundings since the road is curved and extended to the back side of the mountain 17. Thus, from the direction of the user, the road 15 becomes invisible because of the mountain 17. In a further example of FIG. 1C, a view of the road 25 is obstructed ahead by a cliff 27 and other surroundings. Again, because the road 15 is curved and extended to the back side of the cliff 27, it becomes invisible from the direction of the user's vehicle, Here, a point where the road begins to lose its visibility due to the obstruction may also be referred to as a warning point or hidden point. In the example of FIG. 1C, a hidden point 31 is illustrated to indicated the point where the visibility is lost for the road 25. Because of such obstructions, the user may not be able to prepare for the hidden point, which may results in an accident. Therefore, there is a need of a new method and apparatus for a navigation system for finding a hidden point where visibility of a route will be lost on a three-dimensional map image, and producing a warning to notify the user the location of the hidden point, a shape of the route in the vicinity of the hidden point, etc.

SUMMARY OF THE INVENTION

It is, therefore, an object of the present invention to provide a method and apparatus for a navigation system which is able to detect a point where a route on which the user's vehicle is running is hidden by obstruction objects on a three-dimensional map image.

It is another object of the present invention to provide a method and apparatus for a navigation system which is able to produce a warning or notice that a hidden point will be ahead on the three-dimensional map image when the hidden point is detected on the route on which the user's vehicle is running.

It is a further object of the present invention to provide a method and apparatus for a navigation system which is able to produce an image showing a shape of the road in the vicinity of the hidden point so that the user can anticipate a direction of the road and a manner of maneuvering at the hidden area of the road.

One aspect of the present invention is a method for displaying a route on a three-dimensional map image for a navigation system. The method includes the steps of displaying a three-dimensional map image which includes an image of a route on which a user or user's vehicle is travelling, detecting a hidden point of the route on the three-dimensional map image at which the route becomes invisible by an obstruction object when viewed from a current position of the user, and notifying the user about the hidden point on the route thereby enabling the user to know the hidden point on the route in advance.

In the method of the present invention, the step of detecting the hidden point includes a step of examining a start point or an end point of each road segment configuring the route on which the user or user's vehicle is travelling as to whether the start point or the end point is visible from the current location of the user.

In the method of the present invention, the step of detecting the hidden point includes a step of examining a start point or an end point of each road segment configuring the route on which the user or user's vehicle is travelling as to whether the start point or the end point is visible from the current location of the user with respect to an obstruction object with use of map data indicating locations of the start point and end point of the road segment and map data indicating a location, size and shape of the obstruction object.

Further, the step of detecting the hidden point includes a step of examining a start point or an end point of each road segment configuring the route on which the user or user's vehicle is travelling as to whether the start point or the end point is visible from the current location of the user with respect to an obstruction object, and a step of narrowing down a location of the hidden point when the start point or the end point of road segment is determined invisible. The step of narrowing down the location of the hidden point includes a step of finding a first middle point which is a center point between a visible start point or end point and an invisible start point or end point of a road segment.

Further, the step of narrowing down the location of the hidden point further includes a step of finding a second middle point which is a center point between the first middle point and the visible start point or end point of the road segment when the first middle point is invisible, or between the first middle point and the invisible start point or end point of the road segment when the first middle point is visible, a step of finding a third middle point which is a center point between the first middle point and the second middle point, and a step of repeating the above steps of finding a center point until the location of the hidden point with desired accuracy is detected.

In the present invention, the step of notifying the user about the hidden point on the route includes a step of displaying a warning tag on the three-dimensional map image when the hidden point on the route is detected. The warning tag on the three-dimensional map image includes information on the detected hidden point which includes a distance and an estimated time to the hidden point.

The method of the present invention further includes a step of displaying a hidden route maneuver screen on the screen three-dimensional map image which shows a shape of the route in the vicinity of the hidden point thereby enabling the user to know a direction in an area of the hidden point on the route. The hidden route maneuver screen includes information on the detected hidden point which includes a distance and an estimated time to the hidden point.

Another aspect of the present invention is an apparatus for a navigation system for implementing the steps defined in the method of the present invention noted above. The apparatus includes various means to detect a hidden point where the route on which the user's vehicle is running is hidden by obstruction objects such as building, mountains, etc., on the three-dimensional map image of the navigation screen. When the hidden point is detected on the route on which the user's vehicle is running, the apparatus produces a warning tag informing that the hidden point will be ahead on the three-dimensional map image. The apparatus further produces a hidden route maneuver screen on the three-dimensional map image which shows a shape of the road in the vicinity of the hidden point.

According to the present invention, the navigation system is able to detect a point where a route on which the user's vehicle is running is hidden by obstructions such as building, mountains, etc., on a three-dimensional map image of the navigation screen. When the hidden point is detected on the route on which the user's vehicle is running, the navigation system is able to produce a warning or notice that a hidden point will be ahead on the three-dimensional map image. The navigation system further produces a shape of the road in the vicinity of the hidden point so that the user can anticipate directions and intersections associated with the road and a manner of maneuvering at the hidden area of the road.

BRIEF DESCRIPTION OF THE DRAWINGS

FIGS. 3A-3D are schematic diagrams showing an example of method for determining a hidden point on the route under the present invention.

DETAILED DESCRIPTION OF THE PREFERRED EMBODIMENT

The method and apparatus for detecting and warning a hidden route is described in detail with reference to the accompanying drawings. Basically, the method and apparatus of the present invention is designed to detect a point where a route on which the user's vehicle is running is hidden by obstructions such as buildings, mountains, etc., on a three-dimensional map image. When a hidden point is detected, the navigation system produces a warning or notice informing that such a hidden point will be ahead of the road. The present invention is also designed to produce an image showing a shape of the road in the vicinity of the hidden point so that the user can anticipate directions, intersections, and a manner of maneuvering at the hidden area of the road.

Figure 1A:
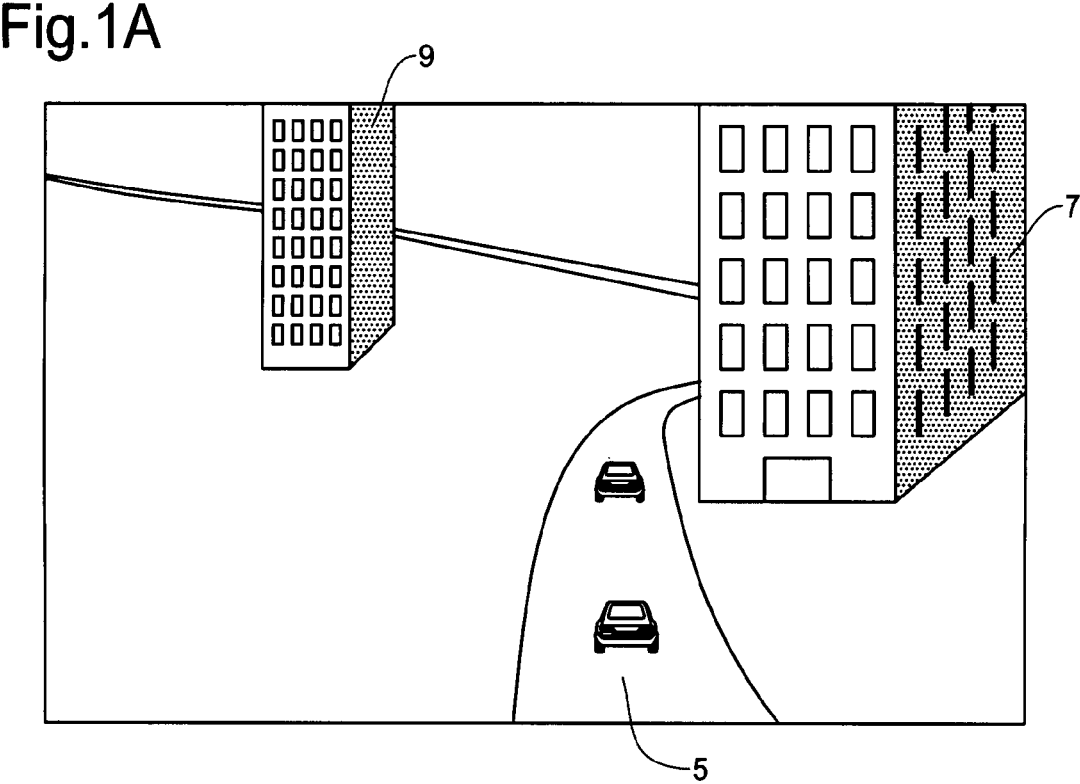
FIGS. 1A-1C are schematic diagrams showing display examples of three-dimensional map image of the navigation system which involve the situations where the visibility of the road is obstructed, wherein a view of the road is obstructed by buildings in FIG. 1A, a view of the road is obstructed by a mountain in FIG. 1B, and a view of the road is obstructed ahead by a cliff in FIG. 1C.
Figure 1B:
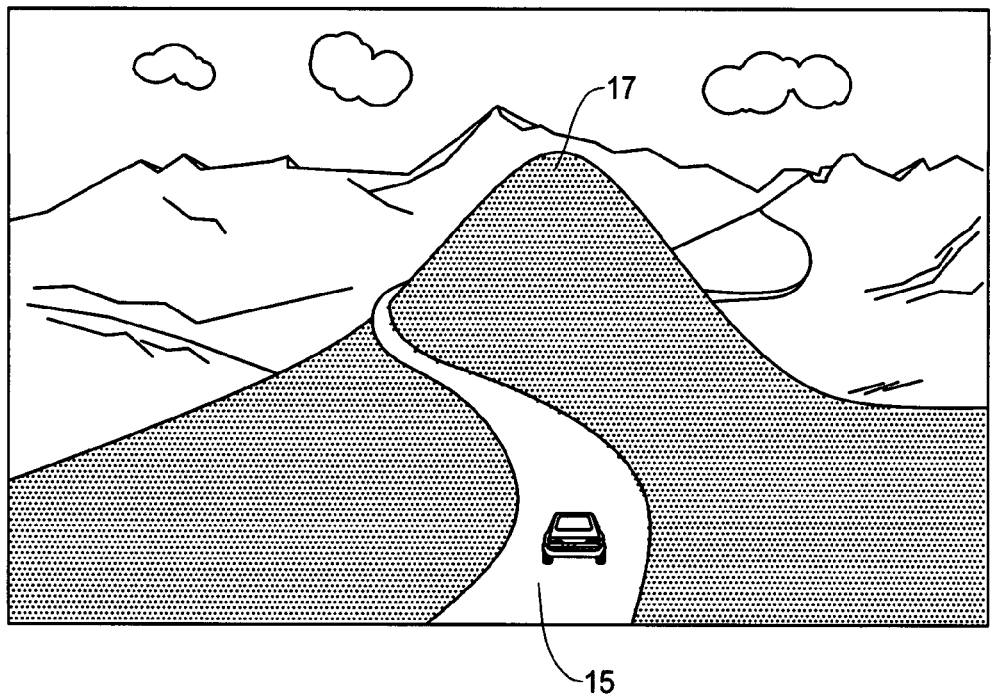
Figure 1C:
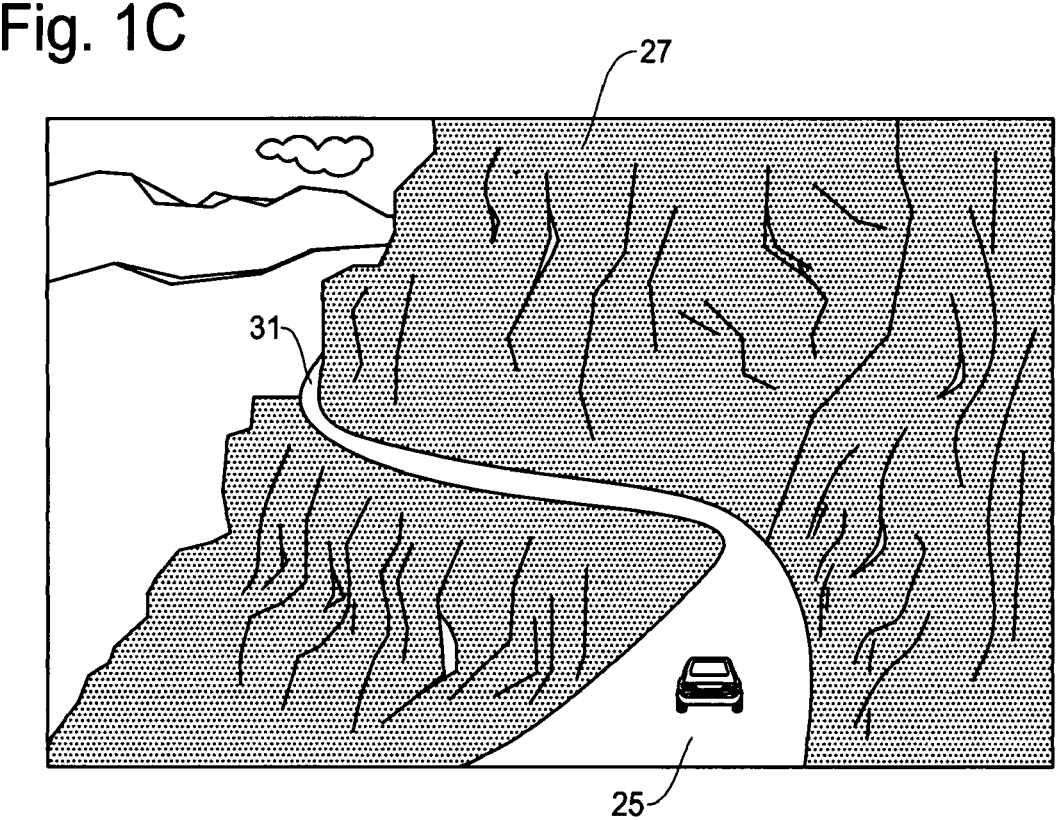
Figure 2:
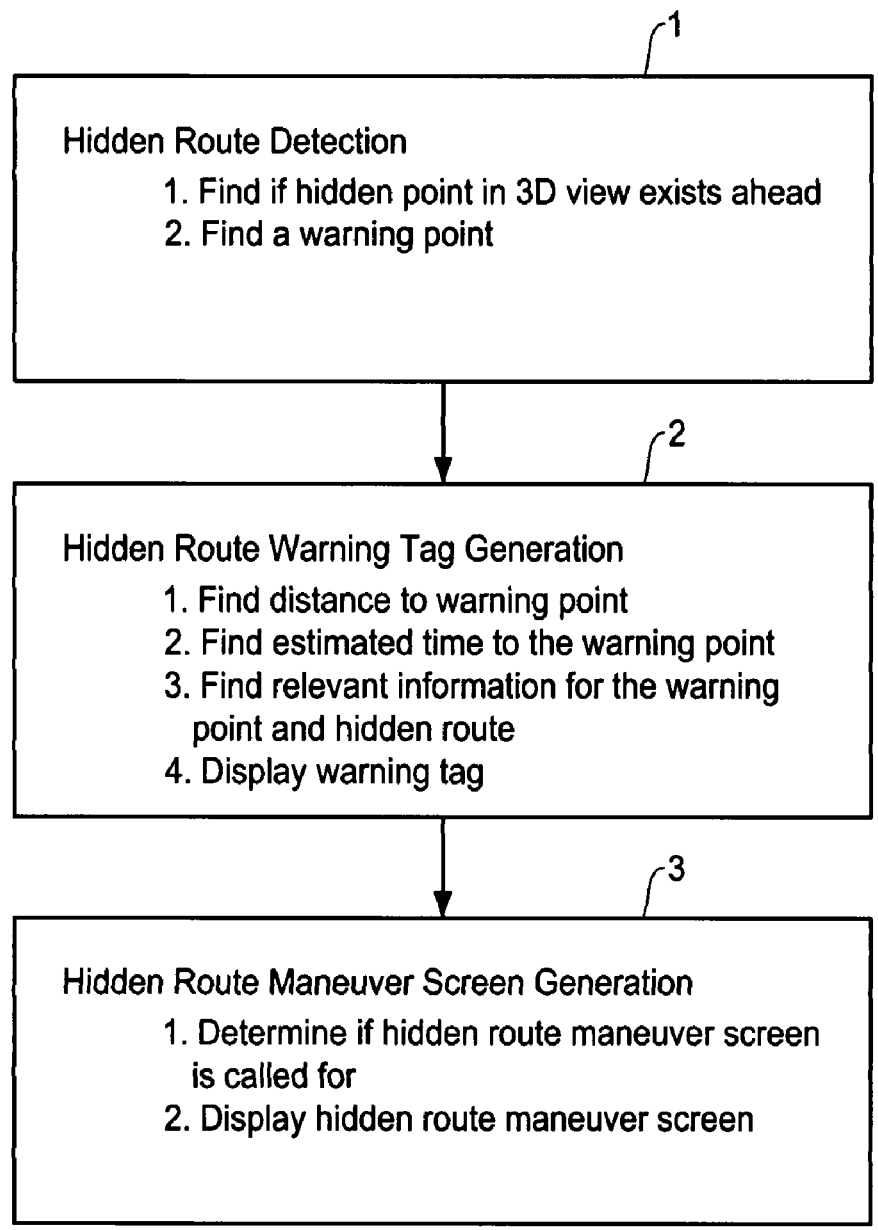
FIG. 2 is a flow chart showing basic steps of an overall operation of the hidden point detection and warning method and apparatus of the present invention.

FIG. 2 is a flow chart showing the basic operation steps in the present invention. The procedure for detecting and warning a hidden point on the route is constituted by three basic phases. First, the navigation system detects the hidden point on the route in the step 1. In this step, the navigation system determines a location on the route where the user will likely lose visibility on a three-dimensional map image on the navigation screen. This situation arises in the conditions described above with reference to FIGS. 1A-1C.

Second, when the hidden point is detected, the navigation system produces a warning or notice on the three-dimensional map image in the step 2. Typically, such a warning is displayed as a warning tag on the three-dimensional image. The warning tag includes relevant information regarding the hidden (warning) point, such as a location of the hidden point, a distance and an estimated time to the hidden point, etc., in a text form. The navigation system may also produce such warning messages through voice speech.

Third, the navigation system displays a hidden route maneuver screen in the step 3 on the three-dimensional map image. Typically, such a hidden route maneuver screen includes a shape of the road in the vicinity of the hidden point. The hidden route maneuver screen shows the shape of the road which incorporates directions and cross sections involved in the hidden route. The hidden route maneuver screen may also include a distance indicator which is a scale like icon showing a distance to the hidden point. The hidden route maneuver screen may also include an alert message in a text format or video image, etc.

These phases will be described in more detail below. As noted above, the navigation system first attempts to detect a hidden point on the route. An example of method for detecting a hidden point is described with reference to schematic views of FIGS. 3A to 3C and a flow chart of FIG. 4. This method allows the navigation system to detect the point on the route where the route begins to be obstructed by such elements as buildings, mountains, etc. Within the context of the present invention, this point will be referred to as a hidden point or a warning point.

FIGS. 3A and 3B are schematic diagrams showing an example of method for determining a hidden point on the route under the present invention. The example of FIGS. 3A-3D include a vehicle position 141 on a road 25 which has road segments 91a, 91b, 91c and an obstruction object 99 such as a building, mountain, etc. It should be noted that although FIGS. 3A-3D illustrate the relationship between the road segments and the obstruction object in a two-dimensional image for simplicity, it is assumed that the relationship is directed to the situation where part of the road is hidden by the obstruction object on a three-dimensional map image.

As is well known in the art, in the map data for a navigation system, each road is configured by a large number of road segments. Typically, each road segment is defined at least by a start point and an end point where an absolute location of each point is specified by latitude and longitude data. In addition to the start and end points, as is known in the art, one or more shape points may also be provided to a road segment when such a road segment cannot be represented by a straight line.

Further, for generating the three-dimensional image, the map data include information regarding the locations, shapes and sizes of the buildings, mountains, etc., which may obstruct the view of the road. For example, polygon data for buildings, bridges, mountains, stadium, etc. in the map data describe the absolute locations, sizes and shapes of such objects. Such data on the buildings, mountains, etc., are also used to detect the hidden point in the present invention in the manner described below.

Starting from the vehicle position VP which is also denoted by a numeral 141, the navigation system will detect the visibility in the three-dimensional image for each point of the route. Here, it is assumed that each point is either a start point or an end point of the road segment that links adjacent road segments. The navigation system checks the visibility by, for example, using a ray tracing method or a collision detection method commonly used in game machine technologies.

Referring to FIG. 3A, the navigation system will check the visibility of the road 25 at the point 93 which is an end point of the road segment 91a (also a start point of the road segment 91b). The navigation system determines that the point 93 is visible because the point 93 is sufficiently apart from the obstruction object 99 when viewed from the vehicle position VP. Thus, the navigation system checks the next point 95 on the road 25 which is an end point of the road segment 91b (also a start point of the road segment 91b). Again, the navigation system determines that the point 95 is visible because the point 95 is sufficiently apart from the obstruction object 99 when viewed from the vehicle position VP.

The navigation system then checks the point 97 which is an end point of the road segment 91c. Since the point 97 is well inside of the obstruction object 99 when viewed from the vehicle position VP, the navigation system determines that the point 97 is not visible on the three-dimensional map image. This situation can be detected by the ray tracing method or the collision detection method noted above. Namely, such a method is able to find out, based on the map data, that the point 97 and the obstruction object 99 overlapped with one another when viewed from a particular location or direction. The particular location or direction in this case is the current vehicle position 141 which is considered during this process because an angle or direction toward the obstruction object 99 from the user affects the visibility of the route.

Once the first invisible point of the route is detected in this manner, the segment between the last visible point and the first invisible point are taken into consideration to determine a location of the hidden point more precisely. This process is explained with reference to FIG. 3B which shows a first middle point 81a on the road segment 91c. As noted above, the end point 97 of the road segment 91c is determined to be the first invisible point on the route while the start point 95 of the road segment 91c is determined to be the last visible point on the route. The first middle point 81a is a center between the last visible point 95 and the first invisible point 97. Since the absolute locations of the start point and the end point of each road segment are known, the location of the first middle point can be calculated easily.

With respect to the first middle point 81a, the navigation system then detects the visibility in the three-dimensional map image in the manner similar to that described above. If it is determined that the first middle point 81a is not visible as in the case of FIG. 3B, the navigation system will detect a next middle point between the first middle point 81a and the last visible point 95. This is a process of narrowing down the location to determine the more precise position of the hidden (warning) point on the road. This process is conducted because each road segment in the map data is basically defined only by a start position and an end position, the distance between them is not small enough to specify the hidden point.

As shown in FIG. 3C, a second middle point 81b is determined which is a center of the first middle point 81a and the last visible point 95. The navigation system repeats the similar procedure noted above for determining whether the second middle point 81b is visible or not. In the example of FIG. 3C, it is assumed that the navigation system determines that the second middle point 81b is visible because the second middle point 81b is not overlapped with any part of the obstruction object 99 when viewed from the vehicle position VP.

The navigation system then finds a next middle point between the second middle point 81b and the first middle point 81a, and finds a third middle point 81c as shown in FIG. 3D. The third middle point is a center of the second middle point 81b and the first middle point 81a. In this manner, when the last middle point is visible, the next middle point is determined by finding a new middle point between the last middle point and the middle point that has been determined to be invisible. Likewise, when the last middle point is not visible, the next middle point is determined by finding a new middle point between the last middle point and the middle point that has been determined to be visible.

By repeating the above procedure, the navigation system is able to find a spot with sufficient accuracy where the user is likely to lose visibility ahead of the route on the three-dimensional image. The number of repetition for finding the warning (hidden) point is determined by many factors, such as a desired accuracy level, a desired speed or time of operation, an available computation power of the navigation system, etc. Although a larger number of repetition tends to increase the accuracy, a time for the performance (time required to find the warning point) becomes longer and prohibitive. Thus, the navigation system may be set a predetermined number of repetition to be performed to find a warning (hidden) point that is within an acceptable tolerance.

Figure 4:
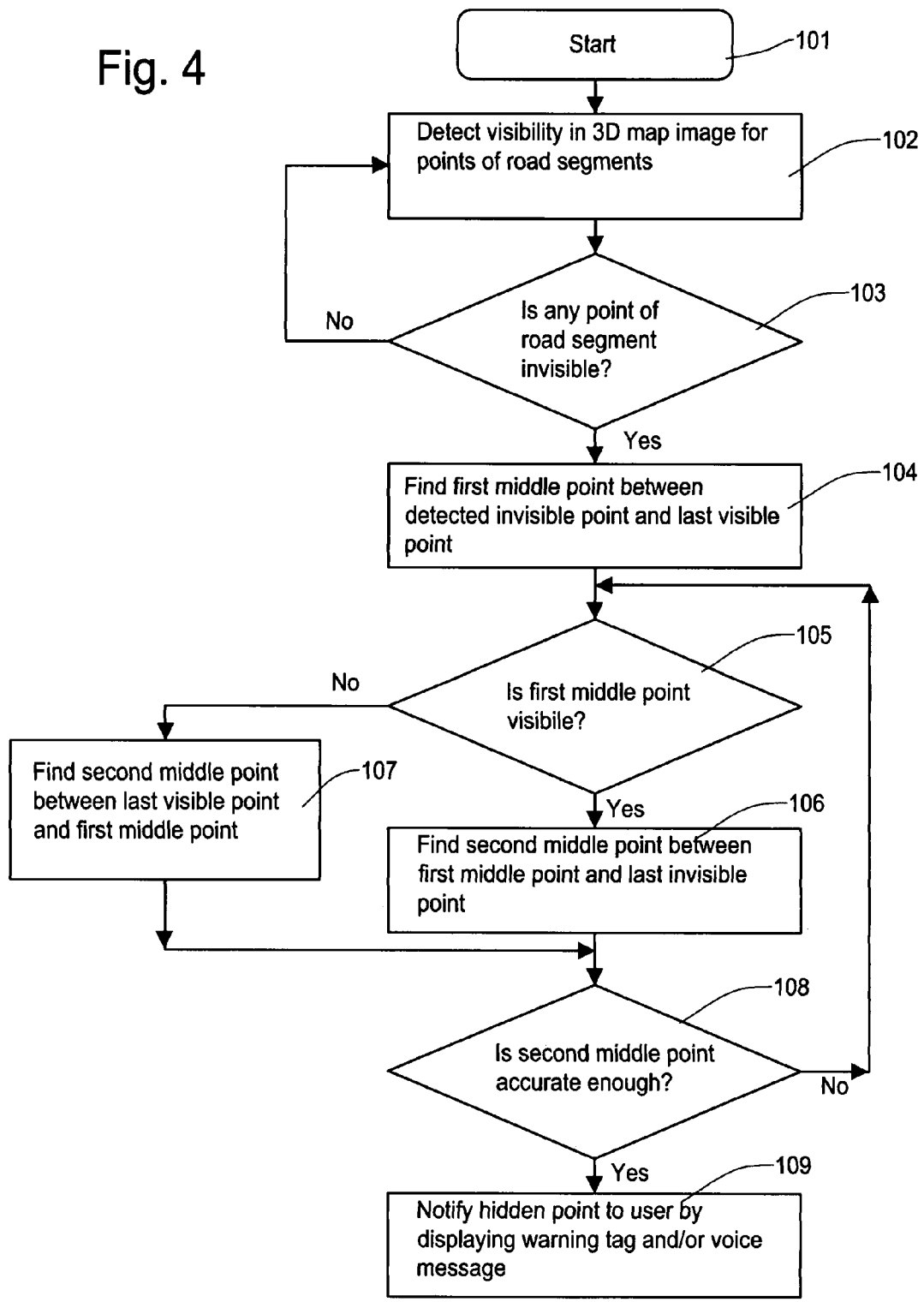
FIG. 4 is a flow chart showing operational steps for finding a hidden point on the route on which the user's vehicle is running under the present invention which correspond to the example shown in FIGS. 3A and 3B.

FIG. 4 is a flow chart summarizing the process of determining the hidden (warning) point described with reference to FIGS. 3A-3D. When the process of detecting the hidden point on the route starts at the step 101, the navigation system detects the visibility of each point on the route from the vehicle position VP in the step 102. As noted above, this detection can be done by using the ray tracing method, the collision detection method, or the like typically used in the game machines.

First, the navigation system determines whether points on each road segment is visible or invisible in the step 103. Typically, each road is configured by a plurality of road segments where each road segment is defined by absolute locations of its start point and end point. Thus, in the step 103, the navigation system checks whether a start point and an end point of each road segment is visible or not. The navigation system keeps checking the start point and the end point until an invisible point is found.

If an invisible point is found, the navigation system determines a first middle point between the invisible point and the last visible point in the step 104. Typically, the first middle point is a center between the invisible point and the last visible point. As noted above, since the absolute locations of the start point and the end point of each road segment are known, the navigation system can easily calculate the location of such a middle point. Then, the process determines whether the first middle point is visible or not in the step 105. If the first middle point is invisible, in the step 107, the navigation system finds a second middle point between the last visible point and the first middle point.

If on the other hand, in the step 105, the first middle point is visible, the navigation system finds a second middle point between the last invisible point to the first middle point in the step 106. In either case, the navigation system determines whether the second middle point obtained in either in the step 107 or in the step 106 is within an acceptable tolerance in the step 108. That is, it is determined whether the location of the second middle point is sufficiently precise enough as the actual spot where the user is likely to lose visibility. In other words, the step 108 is to determine the positional accuracy of the hidden point.

If the second middle point is determined to be within an acceptable tolerance, the navigation system finishes the procedure of determining a warning point and proceeds to next operation as needed (step 109). When the second middle point is not determined to be within the acceptable tolerance, the navigation system repeats the procedure of the steps 105-108 described above to find a third middle point, a fourth middle point, and so forth until a hidden point of desired accuracy is detected.

Once the hidden (warning) point is calculated, the navigation system displays a warning tag on the screen to notify the user about the hidden point in the step 109. The navigation system may also produce such a warning by speech sound. The warning tag includes information such as a distance between the hidden point and the user's vehicle, a time remaining to reach the hidden point, a speed limit at the hidden point, and any other restrictions or useful information as available. The warning tag may also include a shape of the road in the vicinity of the hidden point to show directions and intersections, i.e., maneuver points in the hidden area on the route.

Figure 5:
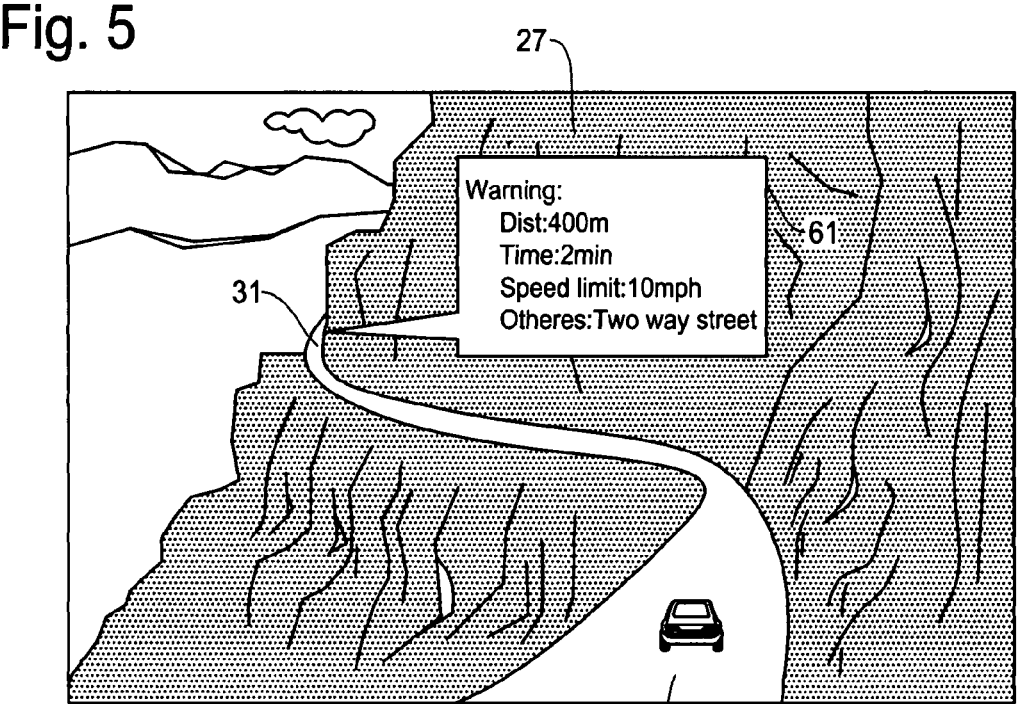
FIG. 5 is a three-dimensional map image on the navigation system screen under the present invention which includes an example of hidden point warning tag.

FIG. 5 is a schematic diagram showing an example of hidden route warning tag under the present invention. In this display example, a warning tag 61 that points a warning (hidden) point 31 is illustrated on the three-dimensional map image. The warning point 31 is typically a start point where the road becomes invisible. The location of the warning point 31 has been calculated in the process for detecting the hidden route described above. In this example, the warning tag 61 indicates that the distance between the current position and the warning point 31 is about 400 meter, the time expected to reach the warning point 31 is 2 minutes, the speed limit at the warning point 31 is 10 miles per hour, and that the road at the area of the warning point is a two-way street.

Figure 6:
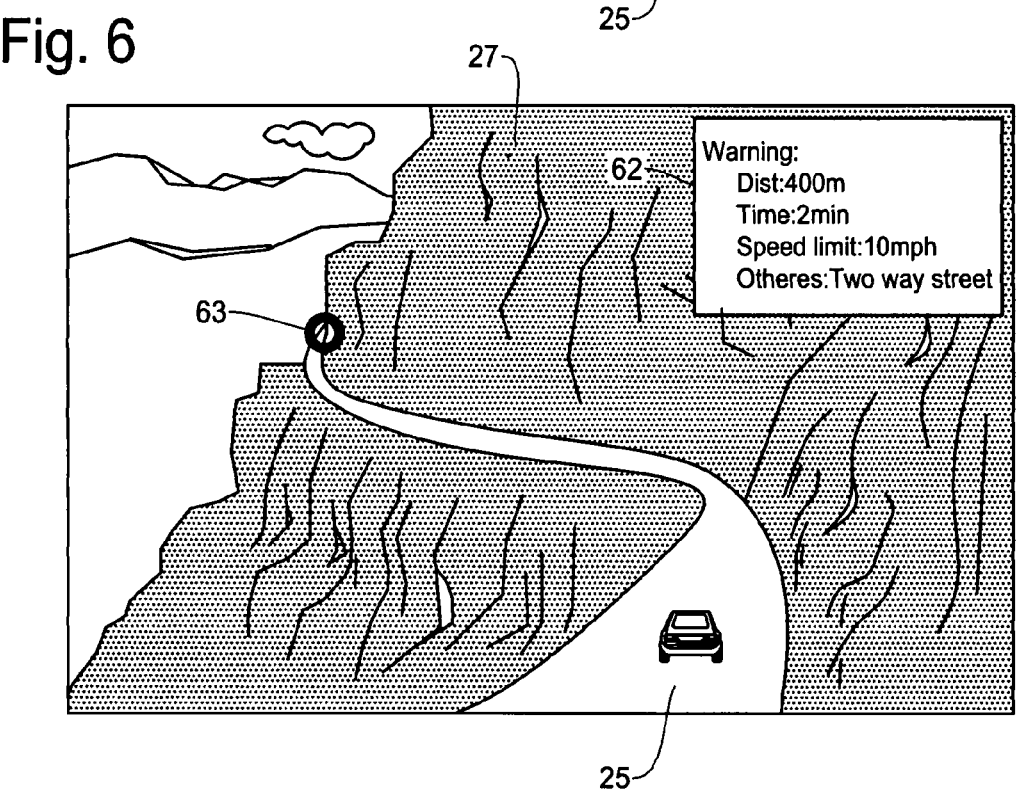
FIG. 6 is a three-dimensional map image on the navigation system screen under the present invention which includes another example of hidden point warning tag where a warning point is denoted by a circle marker.

An alternative display example is shown in FIG. 6, wherein a warning (hidden) point 63 is illustrated by a circle which is highlighted and a warning tag 62 indicating information directed to the warning point 63 is shown at the top right corner of the screen. Since the warning point 63 is highlighted by the circle, the warning tag 62 itself is not pointed to the warning point 63. In this example, the warning tag 62 contains the same information as that in the warning tag 61 in FIG. 5.

The manner of illustrating a hidden point and a warning tag is not limited to those described in the foregoing but may take other forms. For instance, the warning point 63 may take other shape such as an exclamation mark, a specific icon, flashing, etc. The warning tag 62 may be placed at other locations such as at the center of the screen. The navigation system may calculate an ideal location to place the warning tag 62 so that the important information on the three-dimensional map image would not be obstructed by the warning tag 62. The warning tag may accompany the warning message or other information by voice speech.

The navigation system may constantly monitor the vehicle position to the warning point, and update the information as necessary. For instance, as the vehicle comes closer to the warning point, the distance to the warning point and expected time to reach the warning point indicated in the warning tag will change accordingly to provide the updated information.

Figure 7:
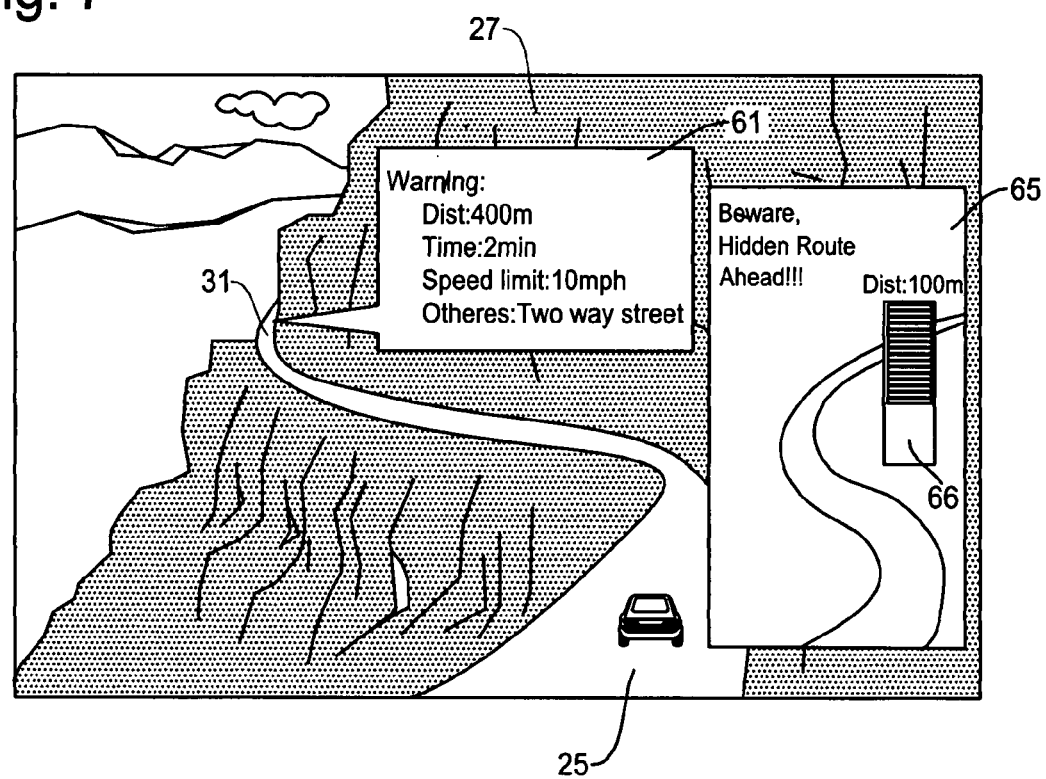
FIG. 7 is a three-dimensional map image on the navigation system screen under the present invention which includes an example of a hidden point warning tag and a hidden route maneuver screen.

To prepare for the curve or turn on the hidden route, a hidden route maneuver screen may be preferably illustrated on the navigation system screen. This screen helps the user to know in advance the warning point and a shape of the road beyond the warning point. FIG. 7 is an example of screen display including such a hidden route maneuver screen 65. The hidden route maneuver screen 65 includes a shape of the road ahead of the warning point 31 which is preferably illustrated in a three-dimensional manner.

Thus, the user is able to expect the road condition, such as a direction, curve, intersection, etc., to be encountered on the hidden route through an intuitive graphic display. In this example, a distance indicator 66 is provided on the hidden route maneuver screen 65 to allow the user to know the size of the hidden road. The distance indicator 66 also graphically indicates the distance from the current vehicle position VP to the warning point 31.

Typically, the navigation system will be so set that the hidden route maneuver screen 65 will be displayed when the vehicle reaches a certain predetermined distance range to the warning pint. In the example of FIG. 7, both the hidden route maneuver screen 65 and the hidden route warning tag 61 are displayed. Alternatively, the navigation system may first display the hidden route warning tag 61, then erase the hidden route warning tag 61 and display the hidden route maneuver screen 65 so that the three-dimensional map image will not be significantly interrupted. The location of placing the hidden route maneuver screen 65 is not limited to the example of FIG. 7, but may be positioned at any location on the display screen.

Figure 8:
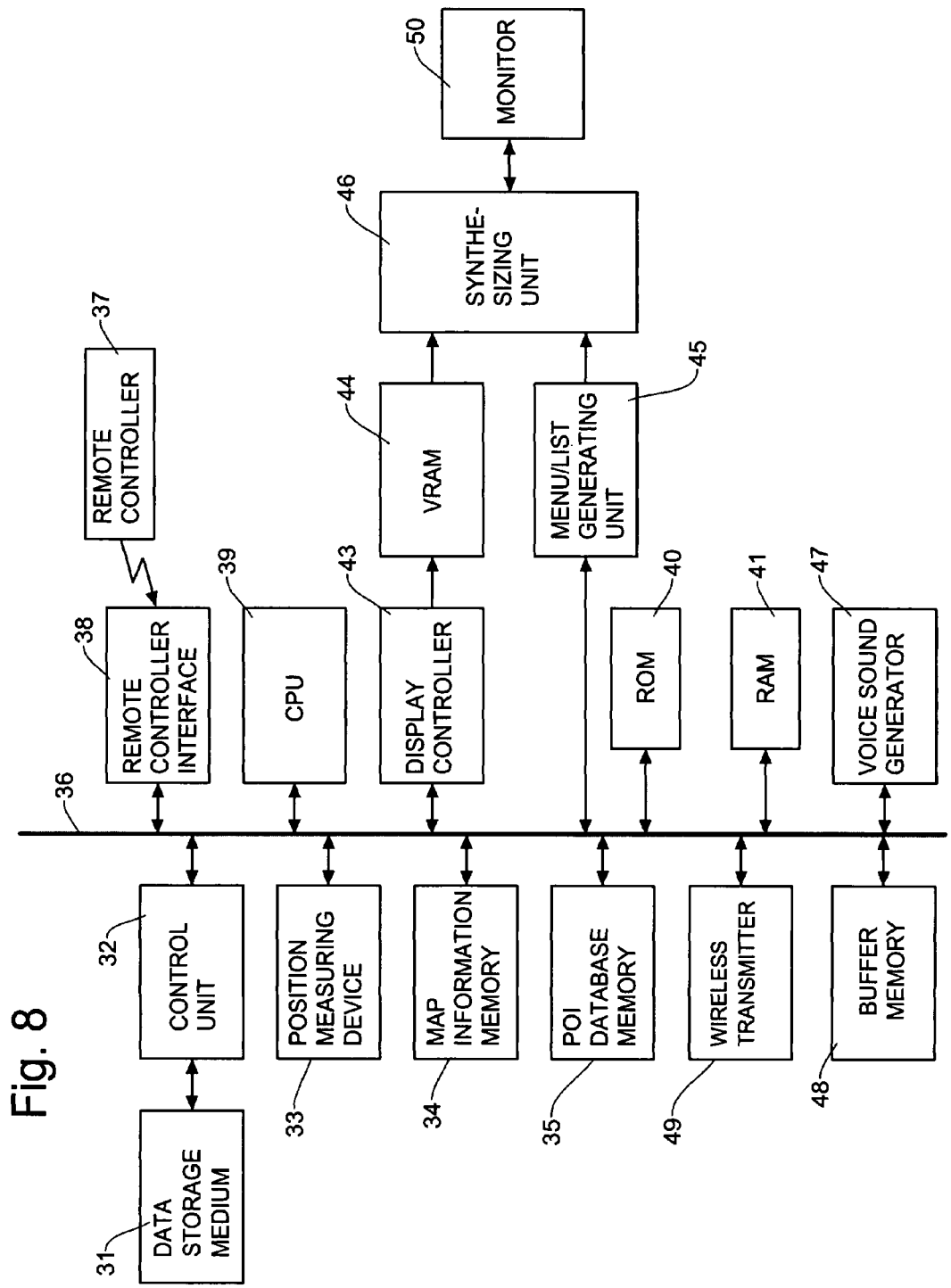
FIG. 8 is a block diagram showing an example of configuration of a vehicle navigation system implementing the hidden route detection and warning method of the present invention.

FIG. 8 shows an example of structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means for storing the map data. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction or angle, a GPS (global positioning system) receiver for receiving GPS signals from artificial satellites, a microprocessor for calculating a position, and etc.

The block diagram of FIG. 8 further includes a map information memory 34 for storing the map information which is read from the data storage medium 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 8, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a wireless transmitter 49 for wireless communication to retrieve data from a remote server, a buffer memory 48 for temporally storing data for ease of data processing, a voice sound generator 47 for generating speech sound for providing the route guidance and the warning regarding the hidden point noted above by speech sound, and a monitor (display) 50.

A program to detect the hidden route as explained above with reference to FIGS. 3A, 3B and 4 may be stored in the data storage medium 31 or ROM 40. Moreover, the calculation of the hidden route warning tags and generation of the hidden route maneuver screen may also be performed by a program stored in the data storage medium 31 or ROM 40, which is executed by CPU 39 or another processor. The hidden route warning tag and hidden route maneuver screen are displayed on the monitor 50.

As has been described above, according to the present invention, the navigation system is able to detect a point where a route on which the user's vehicle is running is hidden by obstructions such as building, mountains, etc., on a three-dimensional map image of the navigation screen. When the hidden point is detected on the route on which the user's vehicle is running, the navigation system is able to produce a warning or notice that a hidden point will be ahead on the three-dimensional map image. The navigation system further produces a shape of the road in the vicinity of the hidden point so that the user can anticipate directions and intersections of the road and a manner of maneuvering at the hidden area of the road.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for displaying a route on a three-dimensional map image for a navigation system, comprising the following steps of:

displaying a three-dimensional map image which includes an image of a route on which a user or user's vehicle is travelling;

detecting a hidden point of the route on the three-dimensional map image at which the route becomes invisible by an obstruction object when viewed from a current position of the user; and notifying the user about the hidden point on the route thereby enabling the user to know the hidden point on the route in advance;

wherein said step of notifying the user about the hidden point includes a step of displaying a text message regarding a distance and time to the hidden point from the current position.

2. A method for displaying a route on a three-dimensional map image as defined in claim 1, wherein said step of detecting the hidden point includes a step of examining a start point or an end point of each road segment configuring the route on which the user or user's vehicle is travelling as to whether the start point or the end point is visible from the current location of the user.

3. A method for displaying a route on a three-dimensional map image as defined in claim 1, wherein said step of detecting the hidden point includes a step of examining a start point or an end point of each road segment configuring the route on which the user or user's vehicle is travelling as to whether the start point or the end point is visible from the current location of the user with respect to an obstruction object with use of map data indicating locations of the start point and end point of the road segment and map data indicating a location, size and shape of the obstruction object.

4. A method for displaying a route on a three-dimensional map image as defined in claim 1, wherein said step of detecting the hidden point includes a step of examining a start point or an end point of each road segment configuring the route on which the user or user's vehicle is travelling as to whether the start point or the end point is visible from the current location of the user with respect to an obstruction object, and a step of narrowing down a location of the hidden point when the start point or the end point of road segment is determined invisible.

5. A method for displaying a route on a three-dimensional map image as defined in claim 4, wherein said step of narrowing down the location of the hidden point includes a step of finding a first middle point which is a center point between a visible start point or end point and an invisible start point or end point of a road segment.

6. A method for displaying a route on a three-dimensional map image as defined in claim 5, wherein said step of narrowing down the location of the hidden point further includes a step of finding a second middle point which is a center point between the first middle point and the visible start point or end point of the road segment when the first middle point is invisible, or between the first middle point and the invisible start point or end point of the road segment when the first middle point is visible, a step of finding a third middle point which is a center point between the first middle point and the second middle point, and a step of repeating the above steps of finding a center point until the location of the hidden point with desired accuracy is detected.

7. A method for displaying a route on a three-dimensional map image as defined in claim 1, wherein said step of notifying the user about the hidden point on the route includes a step of displaying a warning tag on the three-dimensional map image when the hidden point on the route is detected.

8. A method for displaying a route on a three-dimensional map image as defined in claim 7, wherein said step of displaying the warning tag on the three-dimensional map image includes a step of providing information on the detected hidden point which includes a distance and an estimated time to the hidden point.

9. A method for displaying a route on a three-dimensional map image as defined in claim 1, further comprising a step of displaying a hidden route maneuver screen on the screen three-dimensional map image which shows a shape of the route in the vicinity of the hidden point thereby enabling the user to know a direction in an area of the hidden point on the route.

10. A method for displaying a route on a three-dimensional map image as defined in claim 9, wherein said step of displaying the hidden route maneuver screen includes a step of providing information on the detected hidden point by audible sound.

11. An apparatus for displaying a route on a three-dimensional map image for a navigation system, comprising:
   means for displaying a three-dimensional map image which includes an image of a route on which a user or user's vehicle is travelling;
   means for detecting a hidden point of the route on the three-dimensional map image at which the route becomes invisible by an obstruction object when viewed from a current position of the user; and
   means for notifying the user about the hidden point on the route thereby enabling the user to know the hidden point on the route in advance;
   wherein said means for notifying the user about the hidden point includes means for displaying a text message regarding a distance and time to the hidden point from the current position.

12. An apparatus for displaying a route on a three-dimensional map image as defined in claim 11, wherein said means for detecting the hidden point includes means for examining a start point or an end point of each road segment configuring the route on which the user or user's vehicle is travelling as to whether the start point or the end point is visible from the current location of the user.

13. An apparatus for displaying a route on a three-dimensional map image as defined in claim 11, wherein said means for detecting the hidden point includes means for examining a start point or an end point of each road segment configuring the route on which the user or user's vehicle is travelling as to whether the start point or the end point is visible from the current location of the user with respect to an obstruction object with use of map data indicating locations of the start point and end point of the road segment and map data indicating a location, size and shape of the obstruction object.

14. An apparatus for displaying a route on a three-dimensional map image as defined in claim 11, wherein said means for detecting the hidden point includes means for examining a start point or an end point of each road segment configuring the route on which the user or user's vehicle is travelling as to whether the start point or the end point is visible from the current location of the user with respect to an obstruction object, and means for narrowing down a location of the hidden point when the start point or the end point of road segment is determined invisible.

15. An apparatus for displaying a route on a three-dimensional map image as defined in claim 14, wherein said means for narrowing down the location of the hidden point includes means for finding a first middle point which is a center point between a visible start point or end point and an invisible start point or end point of a road segment.

16. An apparatus for displaying a route on a three-dimensional map image as defined in claim 15, wherein said step of narrowing down the location of the hidden point further includes means for finding a second middle point which is a center point between the first middle point and the visible start point or end point of the road segment when the first middle point is invisible, or between the first middle point and the invisible start point or end point of the road segment when the first middle point is visible, means for finding a third middle point which is a center point between the first middle point and the second middle point, and means for repeating the above steps of finding a center point until the location of the hidden point with desired accuracy is detected.

17. An apparatus for displaying a route on a three-dimensional map image as defined in claim 11, wherein said means for notifying the user about the hidden point on the route includes means for displaying a warning tag on the three-dimensional map image when the hidden point on the route is detected.

18. An apparatus for displaying a route on a three-dimensional map image as defined in claim 17, wherein said means for displaying the warning tag on the three-dimensional map image includes means for providing information on the detected hidden point which includes a distance and an estimated time to the hidden point.

19. An apparatus for displaying a route on a three-dimensional map image as defined in claim 11, further comprising means for displaying a hidden route maneuver screen on the screen three-dimensional map image which shows a shape of the route in the vicinity of the hidden point thereby enabling the user to know a direction in an area of the hidden point on the route.

20. An apparatus for displaying a route on a three-dimensional map image as defined in claim 19, wherein said means for displaying the hidden route maneuver screen includes means for providing information on the detected hidden point by audible sound.

* * * * *